United States Patent
Kim et al.

(10) Patent No.: US 11,843,490 B2
(45) Date of Patent: Dec. 12, 2023

(54) METHOD AND APPARATUS FOR TRANSMITTING TRACKING REFERENCE SIGNAL IN NEW RADIO

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 135 days.

(21) Appl. No.: 16/146,920

(22) Filed: Sep. 28, 2018

(65) Prior Publication Data

US 2019/0104005 A1    Apr. 4, 2019

(30) Foreign Application Priority Data

Sep. 29, 2017 (KR) .................. 10-2017-0128172
Jun. 22, 2018 (KR) .................. 10-2018-0071730

(51) Int. Cl.
*H04L 27/26* (2006.01)
*H04L 1/00* (2006.01)
*H04W 72/0453* (2023.01)
*H04B 7/06* (2006.01)
*H04L 5/00* (2006.01)

(52) U.S. Cl.
CPC ....... *H04L 27/2602* (2013.01); *H04B 7/0626* (2013.01); *H04L 1/0026* (2013.01); *H04L 5/0051* (2013.01); *H04W 72/0453* (2013.01); *H04L 5/0094* (2013.01); *H04L 27/26025* (2021.01); *H04L 27/2657* (2013.01)

(58) Field of Classification Search
CPC ............. H04L 27/2657; H04L 1/0026; H04L 27/2602; H04L 5/0007; H04L 5/005; H04L 5/0051; H04L 5/0094; H04B 7/0626; H04W 72/0453
See application file for complete search history.

(56) References Cited

U.S. PATENT DOCUMENTS

2012/0213137 A1* 8/2012 Jeong .............. H04W 72/23
370/311
2015/0003346 A1* 1/2015 Kim ................... H04L 5/001
370/329

(Continued)

OTHER PUBLICATIONS

Mediatek Inc., "Summary of views on TRS", R1-1714855, 3GPP TSG-RAN WG1 Meeting #90, Prague, Czech Republic, Aug. 21-Aug. 25, 2017.

(Continued)

*Primary Examiner* — Jason E Mattis
*Assistant Examiner* — Bao G Nguyen
(74) *Attorney, Agent, or Firm* — INVENSTONE Patent, LLC

(57) ABSTRACT

Provided is a method of transmitting a tracking reference signal (TRS) in a next-generation/5G radio access network, and for transmitting the TRS by a base station to a user equipment. The method may include configuring a resource element shift value K for mapping a frequency domain resource of a TRS to a user equipment, transmitting the K value to the user equipment, and transmitting the TRS mapped to the frequency domain resource based on the K value to the user equipment.

12 Claims, 15 Drawing Sheets

(56) References Cited

U.S. PATENT DOCUMENTS

| | | | |
|---|---|---|---|
| 2015/0003356 A1* | 1/2015 | Seo | H04L 5/0058 370/329 |
| 2015/0063140 A1* | 3/2015 | Yi | H04L 5/005 370/252 |
| 2015/0223254 A1* | 8/2015 | Guo | H04L 1/0072 370/312 |
| 2015/0327315 A1* | 11/2015 | Xue | H04L 5/0044 370/330 |
| 2015/0349940 A1* | 12/2015 | Kim | H04L 5/0023 370/329 |
| 2018/0323918 A1* | 11/2018 | Chuang | H04L 5/005 |
| 2019/0109750 A1* | 4/2019 | Nam | H04L 5/0048 |

OTHER PUBLICATIONS

Huawei et al., "Reference Signal for fine time and frequency tracking", R1 1715475, 3GPP TSG RAN WG1 Meeting AH NR#3, Nagoya, Japan, Sep. 18-21, 2017.

Mediatek Inc., "Summary on TRS remaining issues", R1-1716753, 3GPP TSG-RAN WG1 Meeting Ad hoc#3, Nagoya, Japan, Sep. 18-Sep. 21, 2017.

Huawei et al., "Multiplexing different types of DL RS", R1-1710009, 3GPP TSG RAN WG 1 NR Ad Hoc Meeting, Qingdao, China, Jun. 27-30, 2017.

* cited by examiner

• TRS symbol position N= 3+1 for high speed

FIG. 15B

• TRS symbol position N= 2+2 for normal deployment (MTK)

FIG. 15C

• TRS symbol position N = 3+1

FIG. 15D

• TRS symbol position N = 2+2

FIG. 15E

METHOD AND APPARATUS FOR TRANSMITTING TRACKING REFERENCE SIGNAL IN NEW RADIO

CROSS-REFERENCE TO RELATED APPLICATION

This application claims the priority benefit of Korean Patent Application No. 10-2017-0128172, filed on Sep. 29, 2017 and No. 10-2018-0071730, filed on Jun. 22, 2018 in the Korean Intellectual Property Office, the disclosures of which are incorporated herein by reference in their entirety.

BACKGROUND OF THE INVENTION

1. Field of the Invention

The present disclosure relates to a method of transmitting a tracking reference signal (TRS) in a next-generation/5G radio access network (hereinafter, referred to as a new radio (NR)). More specifically, the present disclosure relates to a method of determining a resource element shift value to determine resources through which a TRS is transmitted, in a frequency range, and signaling the determined resource element shift value to a user equipment.

2. Description of the Prior Art

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for a new radio (NR). It is required to design NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to be designed as flexible frame structures, compared with the LTE/LTE-Advanced.

In particular, a TRS is introduced in the NR to enable a user equipment for tracking a time/frequency range and correcting errors in the time/frequency range. Accordingly, there is a growing need to determine resources used for the TRS and determine a specific method of transmitting the TRS to a user equipment.

SUMMARY OF THE INVENTION

It is an object of the present disclosure to determine resources used for transmitting a TRS in a next-generation/5G radio access network and provide a specific method for transmitting the TRS to a user equipment.

In accordance with some embodiments of the present disclosure, a method of a base station may be provided for transmitting a tracking reference signal (TRS) to a user equipment. The method may include configuring a resource element shift value K for mapping a frequency domain resource of a TRS to a user equipment, transmitting the value K to the user equipment, and transmitting the TRS mapped to the frequency domain resource based on the value K to the user equipment.

In accordance with some embodiments of the present disclosure, a method of a user equipment may be provided for receiving a tracking reference signal (TRS) from a base station The method may include receiving a resource element shift value K for mapping a frequency domain resource of a TRS from the base station, and receiving the TRS mapped to the frequency domain resource based on the K value from the base station.

In accordance with some embodiments of the present disclosure, a base station may be provided for transmitting a tracking reference signal (TRS) to a user equipment. The base station may include a controller configuring a resource element shift value K for mapping a frequency domain resource of a TRS to a user equipment, and a transmitter transmitting the K value to the user equipment and transmitting the TRS mapped to the frequency domain resource based on the K value to the user equipment.

In accordance with some embodiments of the present disclosure, a user equipment may be provided for receiving a tracking reference signal (TRS) from a base station. The user equipment may include a receiver receiving a resource element shift value K for mapping a frequency domain resource of a TRS from the base station, and receiving the TRS mapped to the frequency domain resource based on the K value_from the base station.

In accordance with the embodiments of the present disclosure, it is possible to efficiently determine resources used for transmitting a TRS in a next-generation/5G radio access network, and transmit the TRS to a user equipment.

BRIEF DESCRIPTION OF THE DRAWINGS

The above and other aspects, features and advantages of the present disclosure will be more apparent from the following detailed description taken in conjunction with the accompanying drawings, in which:

FIGS. 15A-15E are diagrams showing an example of a symbol in which the tracking reference signal (TRS) resource elements (REs) are located on a slot basis in a time domain.

DETAILED DESCRIPTION OF THE EXEMPLARY EMBODIMENTS

Figure 1:
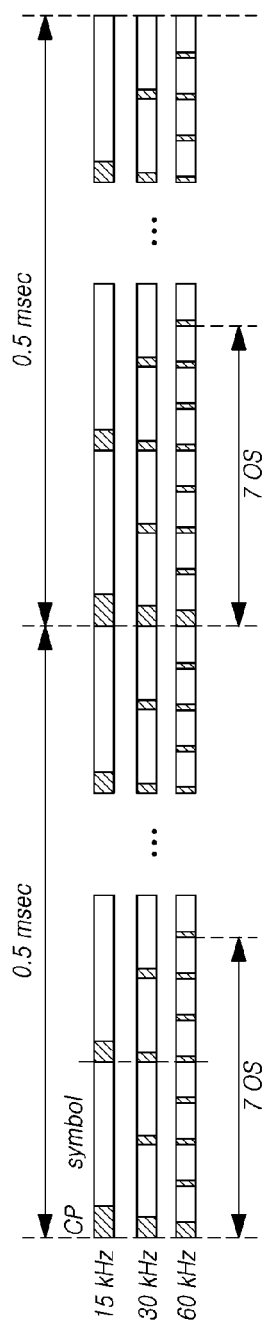
FIG. 1 is a diagram illustrating arrangements of orthogonal frequency division multiple (OFDM) symbols when different subcarrier spacings are used according to embodiments of the present disclosure.
Figure 2:
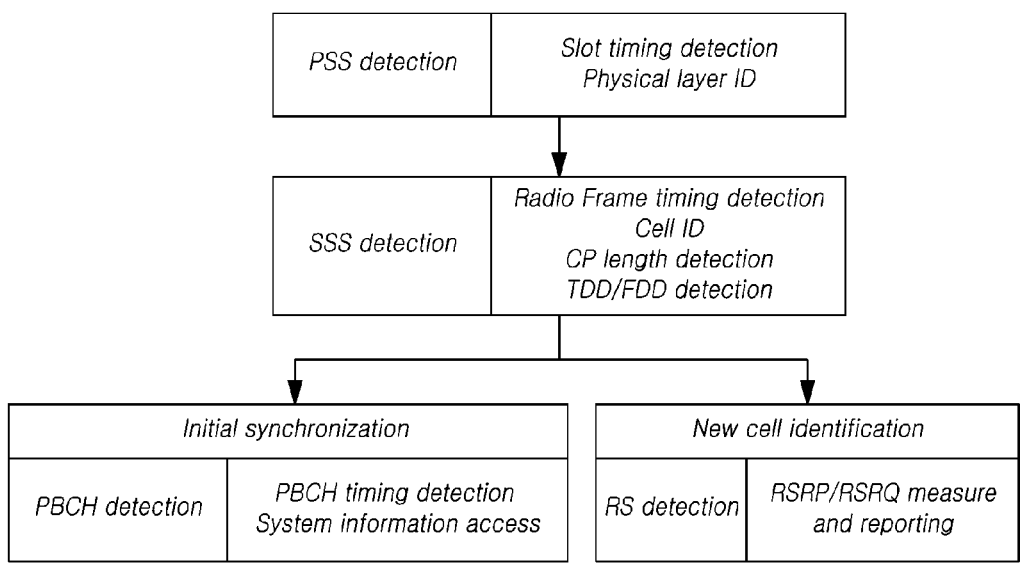
FIG. 2 is a diagram illustrating information obtained in each step of a cell search procedure according to embodiments of the present disclosure.
Figure 3:
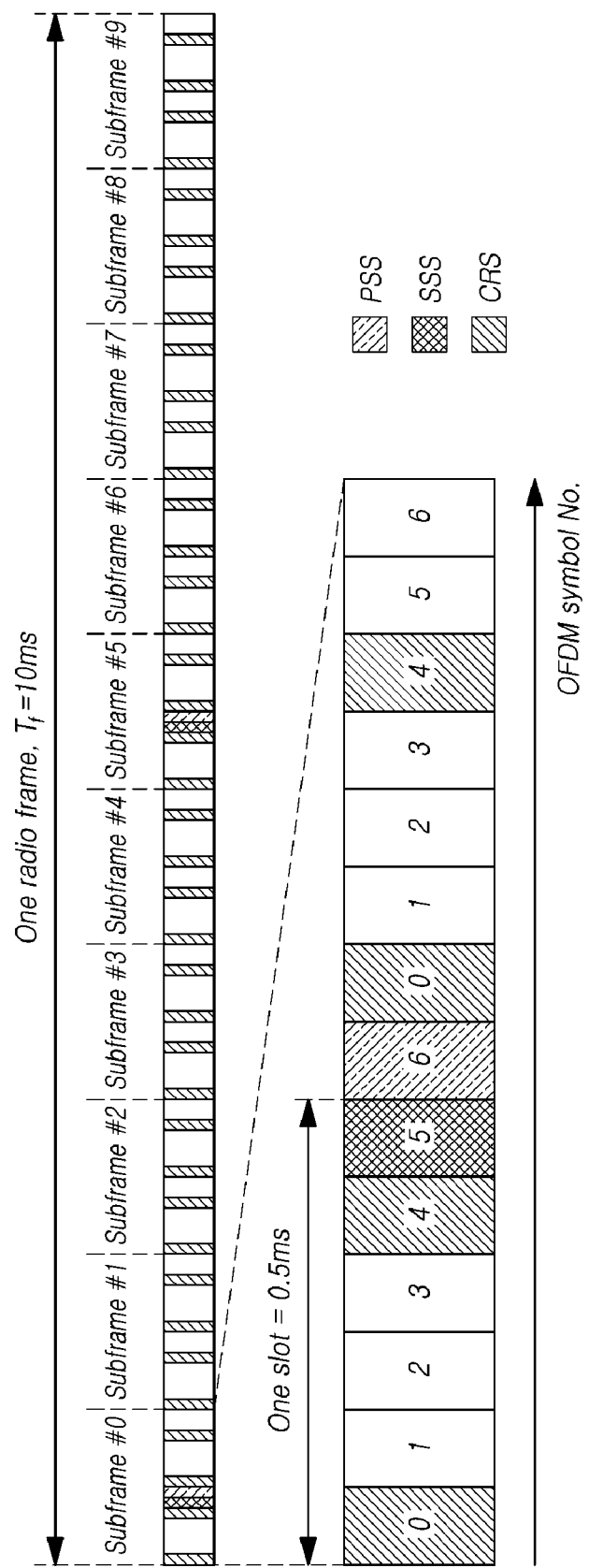
FIG. 3 is a diagram illustrating an example of a primary synchronization signal (PSS) and a secondary synchronization signal (SSS) frame structures (in case of a normal CP) in a frequency division duplex (FDD), according to embodiments of the present disclosure.
Figure 4:
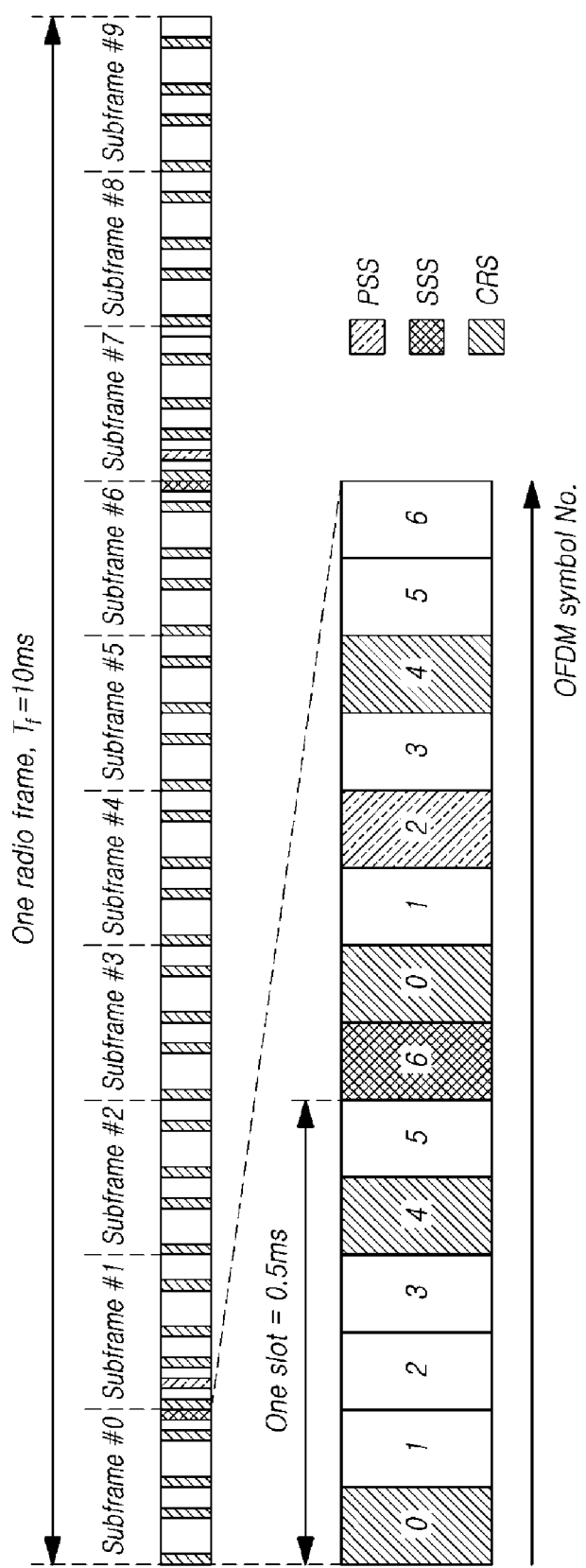
FIG. 4 is a diagram illustrating an example of a PSS and a SSS frame structures (in case of a normal CP) in a time division duplex (TDD), according to embodiments of the present disclosure.
Figure 5:
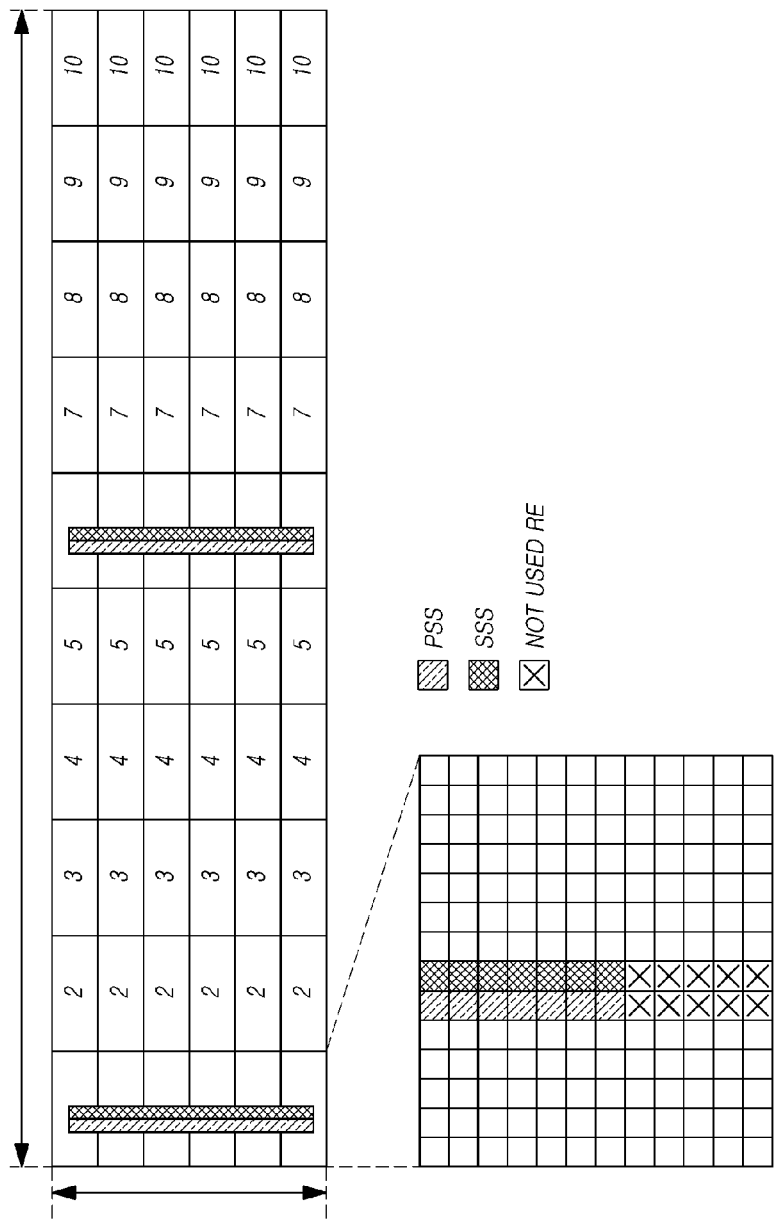
FIG. 5 is a diagram illustrating an example of a PSS and a SSS frame structures in a frequency-time domain of a FDD cell, according to embodiments of the present disclosure.
Figure 6:
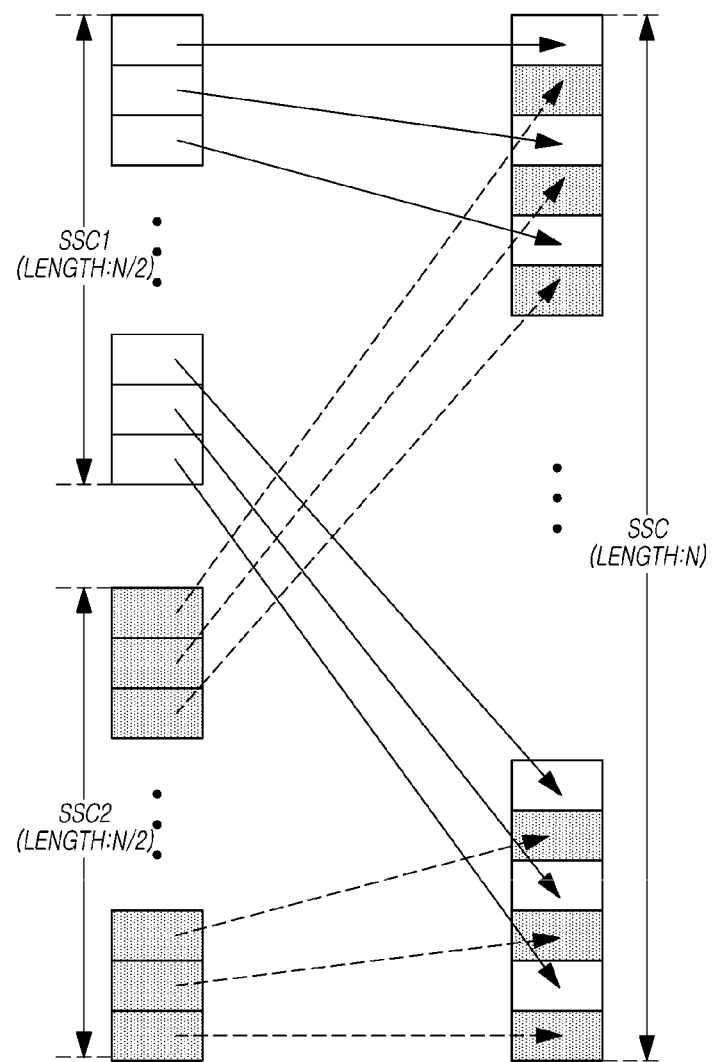
FIG. 6 is a diagram illustrating mapping of a SSS sequence, according to embodiments of the present disclosure.
Figure 7:
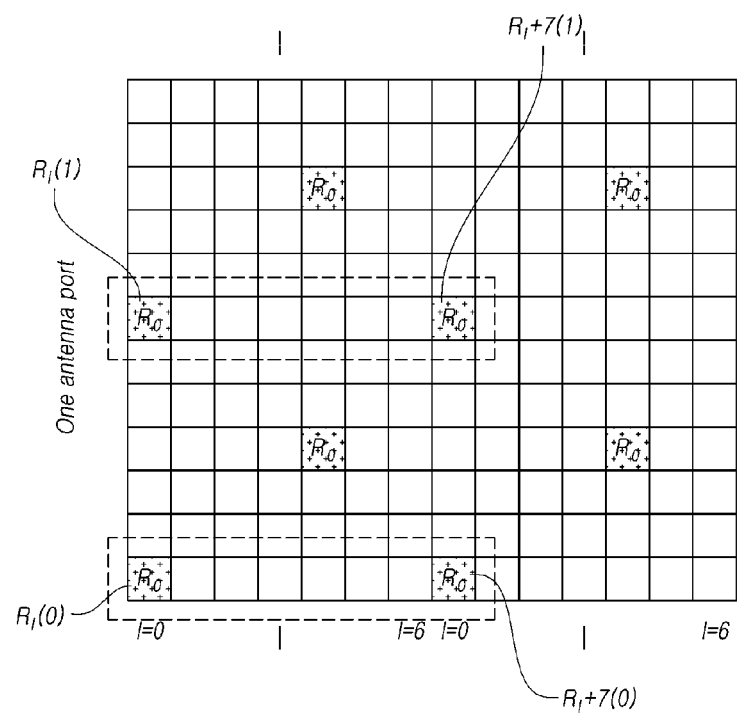
FIG. 7 is a conceptual diagram illustrating a sequence correlation to obtain a frequency offset using CRS port 0, according to embodiments of the present disclosure.

Hereinafter, preferred embodiments of the present disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication, a packet data service, etc. The wireless communication system includes a user equipment (UE) and a base station (BS).

A UE of the present disclosure is defined as a generic term including devices using in wireless communication, such as a UE supporting wideband code division multiple access (WCDMA), long term evolution (LTE), high speed packet access (HSPA), international mobile telecommunications (IMT)-2020 (5G or new radio), or the like, or a mobile station (MS) supporting a global system for mobile communications (GSM), a user terminal (UT), a subscriber station (SS), a wireless device, or the like.

A BS or a cell generally refers to a station communicating with the UE. The BS or the cell of the present disclosure is defined as a generic term including, but not limited to, all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

The BS, which provides radio coverage, is necessary in each of the above-described various cells, and therefore the BS may be classified into two categories. 1) The BS may be an apparatus itself that covers a megacell, a macrocell, a microcell, a picocell, a femtocell, and a small cell, in association with a wireless area, or 2) the BS may indicate a radio coverage area itself. The former BS may be i) apparatuses providing a predetermined radio coverage area and controlled by an identical entity or ii) all apparatuses interacting with each other to cooperatively establish the radio coverage area. According to a method of establishing the radio coverage area, a point, a transmission/reception point, a transmission point, a reception point, or the like can be an example of the BS. The latter BS may be a radio coverage area itself, as a counterpart communication station, for transmitting or receiving a signal by a UE or a neighboring BS to or from the BS.

The cell of the present disclosure may refer to a coverage of a signal transmitted from a transmission point or a transmission/reception point, a component carrier having the coverage of the signal transmitted from the transmission point or the transmission/reception point, or the transmission/reception point itself.

The UE and the BS of the present disclosure are entities of performing uplink and downlink communications used to embody the technology and technical conceptions described in the present disclosure. The UE and the BS are defined as a generic term and not limited to a specific term or word.

The uplink (UL) refers to a scheme for a UE to transmit data to or receive data from a BS, and the downlink (DL) refers to a scheme for the BS to transmit data to or receive data from the UE.

The uplink/downlink transmission may be performed using one of i) a time division duplex (TDD) technique that performs transmission by the allocation of different time slots, ii) a frequency division duplex (FDD) technique that performs transmission by the allocation of different frequencies, and iii) a mixed scheme of the frequency division duplex (FDD) and the time division duplex (TDD).

Further, in the wireless communication system, a standard has been developed by the configuration of the UL/DL based on a single carrier or a pair of carriers.

According to UL/DL configuration, control information may be transmitted through a control channel of an uplink or downlink channel, such as a physical DL control channel (PDCCH), a physical UL control channel (PUCCH). Data may be transmitted through a data channel of the uplink or downlink channel, such as a physical DL shared channel (PDSCH), a physical UL shared channel (PUSCH), and the like.

The DL may refer to communication or a communication path from multiple transmission/reception points to a UE. The UL may refer to communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling for transmitting RRC information including a RRC parameter.

The BS performs DL transmission to the UE. The BS may transmit a physical DL control channel for transmitting DL control information such as scheduling required to receive a DL data channel that is a primary physical channel for unicast transmission, and scheduling approval information for transmission on an UL data channel. Hereinafter, transmission and reception of a signal through each channel may be described as transmission and reception of a corresponding channel.

Any of multiple access techniques may be applied to wireless communication systems of the present disclosure, and therefore no limitation is imposed on them. The multiple access techniques that can be used in wireless communication systems of the present disclosure may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

In the present disclosure, a machine type communication (MTC) device may refer to a UE that is low cost (or low complexity), a UE that supports coverage enhancement, or the like. The MTC device of the present disclosure may refer to a UE defined as a predetermined category for low costs (or low complexity) and/or coverage enhancement.

In other words, the MTC device may refer to a low cost (or low complexity) device category/type newly defined in 3GPP Release-13 and performing LTE-based MTC related operations. The MTC device of the present disclosure may refer to a device category/type that is defined in or before 3GPP Release-12 that supports enhanced coverage in comparison with the existing LTE coverage or supports low power consumption, or may refer to a low cost(or low complexity) device category/type newly defined in Release-13. The MTC device may refer to a further enhanced MTC device defined in Release-14.

A narrowband Internet of Things (NB-IoT) device of the present disclosure refers to a UE supporting radio access for cellular IoT. NB-IoT technology is aimed at indoor coverage improvement, support for large-scale low-speed devices, low latency sensitivity, very low device costs, low power consumption, and optimized network architecture.

An enhanced mobile broadband (eMBB), massive machine-type communication (mMTC), and ultra reliable and low latency communication (URLLC) are proposed as representative usage scenarios for NR. Such representative usage scenarios for NR have been discussed in the 3GPP recently.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

[5G NR]

Recently, the 3GPP has approved the "Study on New Radio Access Technology", which is a study item for research on next-generation/5G radio access technology. On the basis of such a study item, the 3GPP have started discussions about frame structure, channel coding & modulation, waveform, multiple access scheme, etc.

It is required to design the NR not only to provide a data transmission rate enhanced as compared with that of LTE/LTE-Advanced, but also to meet various requirements for detailed and specific usage scenarios. In particular, an eMBB, mMTC, and URLLC have been discussed as representative usage scenarios of the NR, and it has been required to design more flexible frame structures as compared with those for LTE/LTE-Advanced in order to meet the requirements of each usage scenario.

Each usage scenario imposes a different requirements of data rates, latency, coverage, etc. Accordingly, there have been on discussions for efficiently multiplexing radio resource units based on different types of numerology (e.g., a subcarrier spacing (SCS), a subframe, a transmission time interval (TTI), etc.) as a method for satisfying requirements according to usage scenarios through a frequency band of a NR system.

To this end, there also have been discussions about multiplexing numerology having different SCS values based on TDM, FDM or TDM/FDM through one NR carrier, and a technique of supporting one or more time units in configuring scheduling units in a time domain. In this regard, in the NR, a subframe has been defined as one type of time domain structure, and a single subframe duration having 14 OFDM symbols of 15 kHz SCS-based normal CP overhead, like the LTE, has been defined as reference numerology to define a subframe duration. Therefore, the subframe in the NR may have a time duration of 1 ms.

However, unlike the LTE, since the subframe of the NR is an absolute reference time duration, a slot and a mini-slot may be defined as a time unit used for an actual UL/DL data scheduling. In this case, the number of OFDM symbols forming a slot, a value of y, has been defined as y=14 regardless of the numerology.

Therefore, a slot may be formed of 14 symbols. In accordance with transmission directions for the slot, all of the symbols may be used for DL transmission or UL transmission, or the symbols may be used in the configuration of a DL portion+a gap+a UL portion.

Further, a mini-slot formed by fewer symbols than a slot has been defined in certain numerology (or SCS). Therefore, a short time domain scheduling interval for transmitting and receiving UL/DL data may be set based on the mini-slot. Also, a long time domain scheduling interval for transmitting and receiving UL/DL data may be configured by slot aggregation.

Particularly, as in the URLLC, in the case of transmitting and receiving latency critical data, when the scheduling is performed on a per slot basis of 0.5 ms (7 symbols) or 1 ms (14 symbols) defined in a frame structure based on the numerology having a small SCS value such as 15 kHz, it is difficult to satisfy. To this end, the mini-slot formed of fewer OFDM symbols than the slot is defined. Thus, the scheduling for the latency critical data as in the URLLC may be performed based on the mini-slot.

Further, as described above, there has been discussions on a technique of scheduling data in accordance with latency requirements based on the length of the slot (or mini-slot) defined in each numerology, by multiplexing and supporting the numerologies using the TDM or FDM technique, which have different SCS values within one NR carrier. For example, as illustrated in FIG. 1, the length of a symbol for 60 kHz SCS is shortened by a fourth of that for 15 kHz SCS. Accordingly, a 60 kHz-based slot is shortened to have a length of about 0.125 ms as compared with a 15 kHz-based slot having a length of 0.5 ms under the same condition that one slot is configured with seven OFDM symbols.

As described above, there has been discussion on techniques of satisfying each requirement of URLLC and eMBB by defining different SCSs or different TTI lengths in the NR.

[Legacy Synchronization technique: PSS/SSS]

A UE performs a cell-search procedure to access to a LTE cell. The cell-search procedure includes a series of synchronization procedures for enabling the UE to determine parameters related to time/frequency.

By implementing such synchronization procedures, the UE is able to demodulate a DL signal and transmit a UL signal at an appropriate time. The cell-search procedure of the LTE system includes initial synchronization and new cell identification.

Through the initial synchronization, a UE first finds a LTE cell and decodes all the relevant information to register with the LTE cell. Such an initial synchronization may be performed when the UE is powered on or disconnected from a serving-cell.

The new cell identification is performed in a procedure of detecting a new neighboring cell by the UE while the UE is connected to the LTE, and the UE reports measurements for the new cell to the serving-cell to perform a handover.

An eNB transmits two physical channels, such as a primary synchronization signal (PSS) and a secondary synchronization signal (SSS), to all cells, and the UE detects the PSS and the SSS transmitted from the eNB before performing the cell-search procedure including the initial synchronization and new cell check.

When the UE detects the PSS and SSS signals, not only time and frequency synchronization can be performed, but also a physical cell ID (PCID) and the length of a CP can be identified, and information on which of the FDD or TDD techniques the cell uses can be obtained.

Initial Synchronization: When a synchronization signal is detected, the UE may decode a physical broadcast channel (PBCH) and then obtain system information, such as DL system bandwidth, or the like, from the detected results.

New Cell Identification: The UE does not need to decode the PBCH, measures signal quality of a newly-detected cell based on reference signals (RS), and reports the measurements to a serving-cell. (In the LTE, a RSRP can be measured/received, without decoding of the PBCH.)

The synchronization signal is transmitted twice every 10 ms radio frame, and the PSS and the SSS have different structures depending on whether the UE is connected to the FDD cell or the TDD cell.

The PSS of the FDD cell is located in the last OFDM symbols of a first slot and an eleventh slot of 10 ms radio frame. The slot is formed of 6 or 7 OFDM symbols according to the length of a cyclic prefix (CP). Therefore, since the PSS is located in the last symbol of the slot, the UE can obtain information on a slot boundary timing regardless of the length of the CP.

The SSS of the FDD cell is located in a previous symbol of the symbol where the PSS is located. Accordingly, assuming that radio channel characteristics are constant over a longer time than the length of the OFDM symbol, it is possible to coherently detect the SSS based on the PSS.

The PSS of the TDD cell is located in third OFDM symbols of a third slot and a thirteenth slot, and the SSS is located before three OFDM symbols relative to the PSS. In this case, assuming that a coherence time of a channel is sufficiently longer than four OFDM symbols, it is possible to coherently detect the SSS.

The exact location of the SSS is changed according to the length of a CP selected in a cell. Since the UE does not recognize the length of the CP in advance when the cell is detected, the UE can identify and detect two possible SSS locations for each of a normal CP and an extended CP.

If the UE searches all of the FDD and TDD cells, it is necessary to identify a total of four possible SSS locations. The PSS in a specific cell is the same in all frames, but two SSSs in each radio frame may be different from each other. Accordingly, the UE recognizes the radio frame boundary of 10 ms using information on the SSS.

The PSS and the SSS in a frequency domain may be mapped to subcarriers of intermediate six resource blocks (RB). The number of the resource blocks may be determined within the range from 6 to 110 according to a system bandwidth. Since the PSS and the SSS are mapped to the intermediate six RBs, the UE may detect the PSS and the SSS in the same manner, regardless of the bandwidth of a signal from the eNB.

Since the PSS and the SSS are sequences formed of 62 symbols, they are mapped to intermediate 62 subcarriers located around a DC subcarrier, and the DC subcarrier is not used.

Accordingly, all resource elements (RE) in 4 RBs of 6 RBs are used, but in 2 RBs located on the sides, 7 REs are used, and 5 REs are not used. The UE uses an FFT with a size of 64 to detect the PSS and the SSS, which has a lower sampling rate compared with a case where 72 subcarriers are used.

The UE can obtain a physical layer cell ID with specific sequences of the PSS and the SSS. The LTE has a total of 504 physical-layer cell IDs dividing into 168 groups, and each group may be constituted by three cell IDs.

In this case, the three cell IDs may be allocated to a cell controlled by the same eNB. Each of 168 groups is identified based on the SSS sequence, and therefore a total of 168 SSS sequences are required to identify each group.

In the PSS, a Zadoff-Chu (ZC) sequence is used. The ZC sequence is used in a random access preamble and an uplink reference signal, in addition to the PSS.

Three ZC PSSs corresponding to three physical layer IDs of each cell group are used in the LTE, The SSS is based on a M-sequence generating a sequence with the length of 2n−1 by n shift registers. Each SSS sequence is generated by alternately inserting a SSC1 and a SSC2 in a frequency domain through an interleaving scheme. Herein, the SSC1 and the SSC2 are two BPSK modulated synchronization codes with the length of 31.

The two synchronization codes for generating the SSC1 and the SSC2 may be generated by differently cyclic shifting a M-sequence with the length of 31.

In this case, the index of the cyclic shift may be determined by a function of a physical layer cell ID group. The SSC2 is scrambled by a sequence determined by the function of the index of the SSC1, and scrambled once more by a sequence determined by a function of the PSS.

[A Frequency Offset Estimation Method of the LTE]

An existing synchronization signal, that is, the PSS/SSS of the LTE, is allocated to six central resource blocks (RB) to transmit. Basically, the UE can acquire synchronization by just detecting corresponding RBs. However, such a method does not provide a specific synchronization function, such as a fine time/frequency tracking. A residual frequency offset or a phase error can be estimated using one or more CRS ports.

For example, when a total number of sequences of a CRS port 0 is NRS, correlation between two receiving sequences mapped to the corresponding CRS port can be expressed by the following equation 1.

$$C_l(j) = R_l^*(j) R_{l+D_S}(j) \quad \text{[Equation 1]}$$

$R_l$ (j) means a 'j'th received signal received by the UE in the 'i'th symbol'.

In addition, $D_S$ means the distance between two consecutive OFDM symbols.

ρ means a normalized OFDM unit length in consideration of the length of the CP, and is expressed by Equation 2 below.

$$\rho = N_e/N$$

$$N_e = N + N_{CP} \quad \text{[Equation 2]}$$

Here, an equation for finally obtaining the frequency offset by the UE is given by Equation 3 below.

$$\hat{\gamma} = \frac{1}{2\pi D_S \rho} \arg\left[\sum_{j=1}^{N_{RS}} C_l(j)\right] \quad \text{[Equation 3]}$$

Here, it has a range of $$|\gamma| \leq \frac{N}{2N_e S_s}.$$

Therefore, based on the above-described method, the UE may perform synchronization acquisition for compensating the initial frequency offset through the PSSs/SSSs of the six central RBs, obtain information on the entire transmission band through the PBCH, and then estimate an additional frequency offset using the CRS port.

Since the CRS is allocated into the entire frequency bandwidth to be transmitted regardless of a frequency bandwidth setting of the LTE system, it can be a reference signal for setting an accurate synchronization for the entire frequency band.

In addition, the CRS can provide more accurate synchronization acquisition performance because the density of a RS is higher than that of other reference signals.

In addition, in NR, a new tracking reference signal (TRS) can be used to estimate a fine time/frequency tracking, and/or a frequency offset. In this case, the following parameters are considered in the TRS.

$S_f$: TRS subcarrier spacing (RE interval in a frequency domain)

$S_t$: TRS symbol spacing within a slot (RE interval in a time domain)

N: Number of OFDM symbols per TRS within a slot (The number of TRS symbols per slot)

B: TRS bandwidth in terms of number of RBs (Transmission in TRS band)

X: The length of TRS burst in terms of number of slots (The number of TRS burst transmission slots)

Y: The TRS burst periodicity in terms of number of slots (TRS burst transmission frequency)

TRS parameter values can be determined as follows.

$S_f$=4

$S_t$=3/4/5/6 Being discussed

B: Entire BWP bandwidth or ~24, ~50 RBs

X=2

Y: 60 ms or more is not supported. Transmitted at intervals of 160 ms or less.

Figure 8:
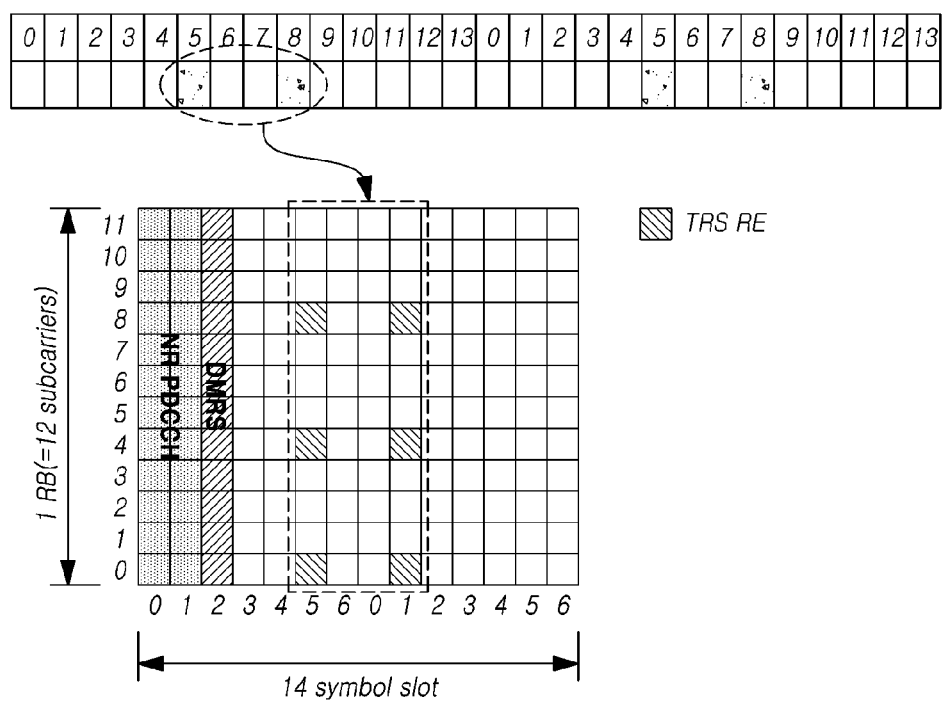
FIG. 8 is a diagram illustrating allocating of a TRS in slots, according to embodiments of the present disclosure.

For example, it is possible to transmit the TRS using the above parameters in the following manner, where (X, $S_f$, $S_t$)=(2, 4, 3/4/5). FIGS. 15A-15E show a symbol in which the TRS REs are located on a slot basis in a time domain. Here, when the frequency interval is $S_f$=4, as a result, the mapping as shown in FIG. 8 can be considered.

In this embodiment, a method of applying the frequency offset of a TRS pattern for reduction of the inter-cell interference and randomization in the frequency domain among the TRS mapping methods will be discussed in detail.

Embodiments described below can be applied individually or in any combination.

EMBODIMENT 1

Using A Shift Value Determined Based on a Cell Basis in Mapping of Frequency Domain Resource Elements of a TRS Basically, the eNB is able to set a UE-specific TRS. That is, a TRS transmission period and TRS RE mapping may be separately set on each UE, which means that the TRS may be transmitted on a UE basis.

Here, to overcome the problem that TRSs between adjacent cells overlap each other, a frequency domain shift value of a TRS pattern may be used. In this case, the frequency domain shift value has the same meaning as the offset value. That is, the frequency domain shift value may also be referred to as a frequency domain offset value, and the meaning is not limited by the term.

Figure 9:
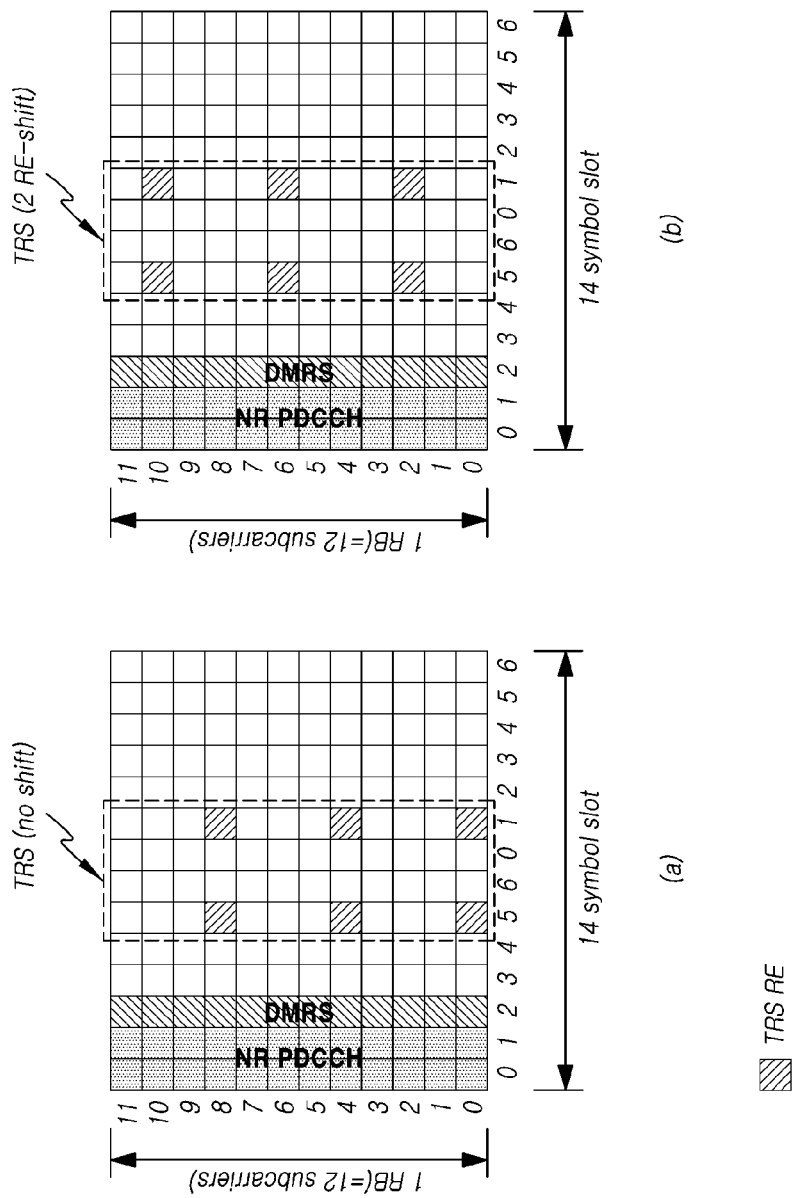
FIG. 9 is a diagram illustrating a pattern of a TRS mapped in a frequency domain according to a frequency domain offset value of the TRS, in accordance with embodiments of the present disclosure.

Basically, when the frequency domain offset of TRS is not applied, the TRS RE may be mapped only to a predefined position (subcarrier index 0/4/8) as illustrated in FIG. 9. However, when the frequency domain offset $N_{offset}$=2 is applied, it is noted that the position to which the TRS RE is mapped is changed to the subcarrier index 2/6/10 as illustrated in FIG. 9.

According to this embodiment, the frequency domain offset of the TRS may be a fixed value for each cell. The method of setting the frequency domain offset, i.e., the shift value, can be largely divided into the following two embodiments.

EMBODIMENT 1-1

Mapping TRS to the Same Location for All Cells

In this embodiment, the frequency domain offset value of the TRS is fixed the same to all the cells. Therefore, the TRSs of all cells are transmitted at the same location, and additional information is not required in addition to the existing TRS setting information (X, $S_f$, $S_t$, N).

EMBODIMENT 1-2

Mapping TRS to a Predetermined Location for Each Cell (Applying Fixed Offset to Each Cell)

In this embodiment, a frequency domain offset value of a TRS for each cell may be used. That is, a UE connected to a specific eNB has recognized the information of the frequency domain offset of the TRS in advance. Therefore, in this method, additional information is not required in addition to the existing TRS setting information (X, $S_f$, $S_t$, N).

EMBODIMENT 2

Setting A Frequency Domain Offset Value to UE by Signaling When a Frequency Domain Resource Element (RE) of the TRS is Mapped In this embodiment, the eNB determines a frequency domain offset value of the TRS for each UE and transmits the determined value to the UE by signaling. In this case, the signaling method may be performed using RRC signaling or dynamic signaling through DCI.

When the RRC signaling is used, a TRS frequency domain offset value, such as TRS setting information, may be transmitted to each UE. That is, depending on the TRS setting value, the TRS position may be changed through a semi-static path.

On the other hand, when the dynamic signaling is used, a field for the frequency domain offset of the TRS is added to the DCI.

If a RE interval value in the frequency domain is already set to $S_f=4$, there may be a total of four shift values, i.e. frequency domain offsets. That is, $N_{offset}$ may equal to 0/1/2/3.

Figure 10:
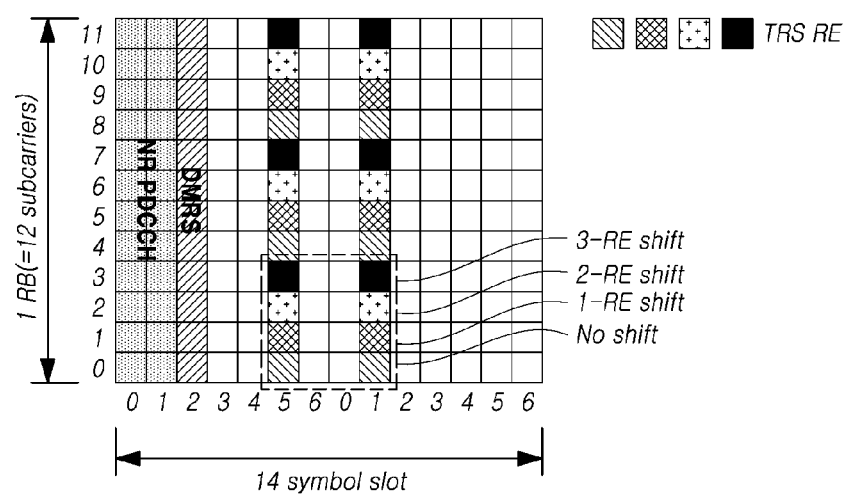
FIG. 10 is a diagram illustrating a pattern of a TRS mapped in a frequency domain according to a shift value of the TRS, in accordance with embodiments of the present disclosure.

A mapping pattern of the TRS in the frequency domain according to the $N_{offset}$ value is shown in FIG. 10.

Referring to FIG. 10, if $N_{offset}=0$, the TRS may be mapped to a resource element indicated by a subcarrier index (0/4/8). If $N_{offse}=1$, then the TRS may be mapped to the resource element indicated by the subcarrier index (0+1/4+1/8+1)= (1/5/9). If $N_{offse}=2$, then the TRS may be mapped to the resource element indicated by the subcarrier index (0+2/4+ 2/8+2)=(2/6/10). If $N_{offse}=3$, then the TRS can be mapped to the resource element indicated by the subcarrier index (0+3/4+3/8+3)=(3/7/11).

A dynamic control may be performed if the $N_{offset}$ value is changed within the TRS transmission period.

If a new Sf value is used at the TRS frequency interval, the $N_{offset}$ may be changed accordingly. That is, it is noted that $N_{offset}=\{0, 1, 2, \ldots, S_f-1\}$.

In the second embodiment, it is noted that the eNB may set the frequency domain offset value used for directly mapping the TRS to each UE and transmit to each UE by separate signaling.

In this case, if a cell-specific TRS frequency domain offset is applied instead of the terminal-specific TRS frequency domain offset, the eNB sets the same $N_{offset}$ value to all terminals located in the cell.

In addition, the TRS may be set at different locations on a cell basis in order to prevent overlapping between cells.

EMBODIMENT 3

Deriving an Offset Value Based on a Specific Value in the Mapping of the Frequency Domain Resource Element (RE) of a TRS In this embodiment, the eNB does not transmit additional signaling to the UE to set a TRS shift pattern. That is, each UE may apply a frequency domain offset of the TRS in an implicit manner using information recognized in advance.

Basically, in order to derive the frequency domain offset of the TRS, the following Equation 4 may be used.

$$N_{offset}=N_{input} \bmod S_f \quad \text{[Equation 4]}$$

The modulo value becomes $S_f$. That is, since the TRS frequency interval $S_f$ is determined as 4 (Sf=4). However, it may change according the $S_f$ value. That is, it is noted that $N_{offset}=\{0, 1, 2, \ldots, S_f-1\}$ Values to be used as the $N_{input}$ are as follows.

Cell ID
UE RNTI
TRS antenna port index
Slot index
Radio frame index
PRB index

EMBODIMENT 3-1

Deriving an Offset Value Based on a Cell ID in the Mapping of the Frequency Domain Resource Element (RE) of a TRS Basically, $N_{offset}$=(Cell ID) mod Sf may be applied to overcome TRS overlapping problem between cells.

In this embodiment, the eNB basically does not perform additional signaling to the UE, but the UE determines the frequency domain offset value of the TRS based on a cell ID of the eNB to which the UE is currently connected.

According to the present embodiment, the frequency domain offset value of the TRS for each cell is set to the same in all UEs in the cell.

EMBODIMENT 3-2

Deriving an Offset Value Based on a UE RNTI in the Mapping of the Frequency Domain Resource Element (RE) of a TRS A frequency domain offset value may be derived using the UE-RNTI, which is a unique ID of each UE. That is, the equation of $N_{offset}$=(UE-RNTI) mod $S_f$ may be applied.

In this embodiment, the eNB basically does not perform additional signaling to the UE, and the UE determines the frequency domain offset value of the TRS based on its current UE-specific RNTI.

According to the present embodiment, the frequency domain offset value of the TRS for each cell is set randomly based on the RNTI of each UE.

Figure 11:
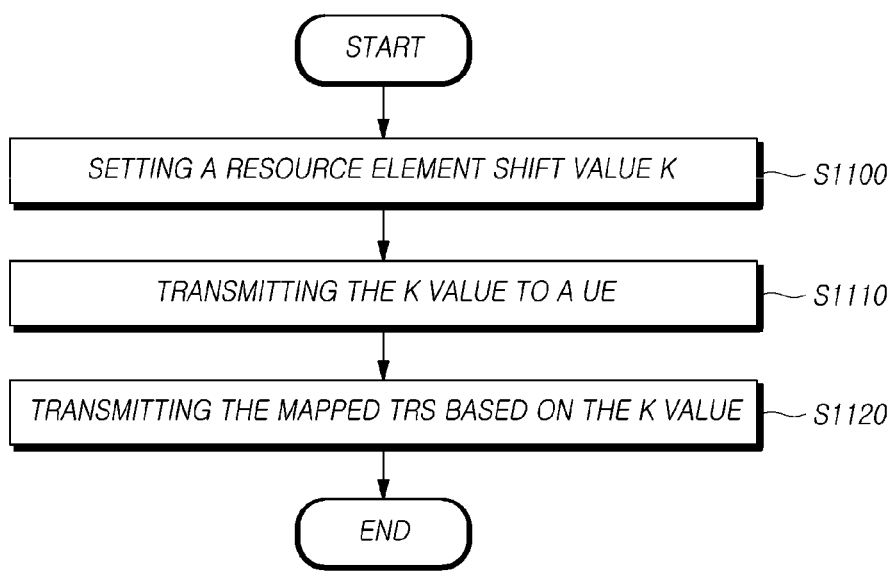
FIG. 11 is a flowchart for showing a specific procedure transmitting a TRS by a base station to a user equipment, according to embodiments of the present disclosure.

FIG. 11 is a flowchart illustrating a method of an eNB for transmitting a TRS to a UE, according to embodiments of the present disclosure.

Referring to FIG. 11, an eNB may configure a resource element shift value K for mapping a frequency domain resource of a TRS transmitted to a UE at step S1100.

In this case, for example, the resource element shift value K may be determined as one of 0, 1, 2, and 3, which is the remainder of 4 and is a frequency interval value of the preset TRS.

In addition, the eNB may transmit the resource element shift value K to the UE at step S1110. The resource element shift value K may be transmitted to the UE by higher layer signaling (e.g., RRC signaling).

For example, a higher layer signaling message for transmitting the resource element shift value K to the UE may be formed of a 4-bit bitmap (the total number of bits of the bitmap may be changed according to the frequency interval value of the TRS). That is, the resource element shift value K indicated by the corresponding higher layer signaling message may be determined depending on whether a value of a bit of bits constituting the bitmap is set to 1.

In addition, the eNB may transmit the TRS mapped to the frequency domain resource based on the resource element shift value K to the UE at step S1120.

For example, the TRS may be mapped at four subcarrier intervals to the frequency domain. That is, the TRS may be mapped to a resource indicated by one of the subcarrier indexes K, K+4, and K+8 on the frequency domain.

At this time, the TRS may be transmitted to the UE through resources in a CSI-RS resource set. That is, instead of allocating a separate resource for the TRS, the eNB may use a part of the resources in the CSI-RS resource set that can be used for the CSI-RS transmission as the TRS. The eNB may transmit information on whether the part of resources in the CSI-RS resource set is used as a TRS to the UE by higher layer signaling (e.g., RRC signaling).

Figure 12:
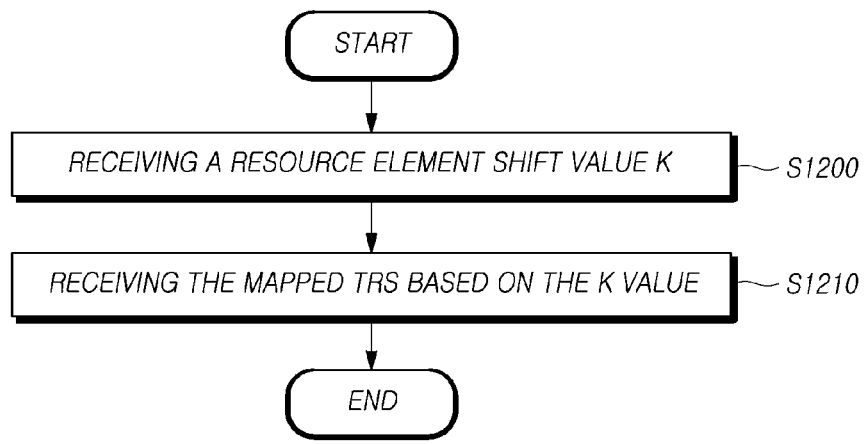
FIG. 12 is a flowchart for showing a specific procedure receiving a TRS by a user equipment from a base station, according to embodiments of the present disclosure.

FIG. 12 is a flowchart for illustrating a method of a UE for receiving a TRS from an eNB according to embodiments of the present disclosure.

Referring to FIG. 12, a UE may receive a resource element shift value K for mapping a frequency domain resource of a TRS from an eNB at step S1200.

In this case, for example, the resource element shift value K may be determined as one of 0, 1, 2, and 3, which is the remainder of 4 and is a frequency interval value of the preset TRS.

The resource element shift value K may be received from the eNB by higher layer signaling (e.g., RRC signaling).

For example, a higher layer signaling message for receiving the resource element shift value K from the eNB may be formed of a 4-bit bitmap (the total number of bits of the bitmap may be changed according to the frequency interval value of the TRS). That is, the resource element shift value K indicated by the corresponding higher layer signaling message may be determined depending on whether a value of a bit of bits constituting the bitmap is set to 1.

In addition, the UE may receive the TRS mapped to the frequency domain resource based on the resource element shift value K from the eNB at step S1210.

For example, the TRS may be mapped at four subcarrier intervals to the frequency domain. That is, the TRS may be mapped to a resource indicated by one of the subcarrier indexes K, K+4, and K+8 on the frequency domain.

At this time, the TRS may be received from the eNB through resources in a CSI-RS resource set. That is, instead of allocating a separate resource for the TRS, the eNB may use a part of the resources in the CSI-RS resource set that can be used for the CSI-RS transmission as the TRS. The eNB may transmit information on whether the part of resources in the CSI-RS resource set is used as a TRS to the UE by higher layer signaling (e.g., RRC signaling).

Figure 13:
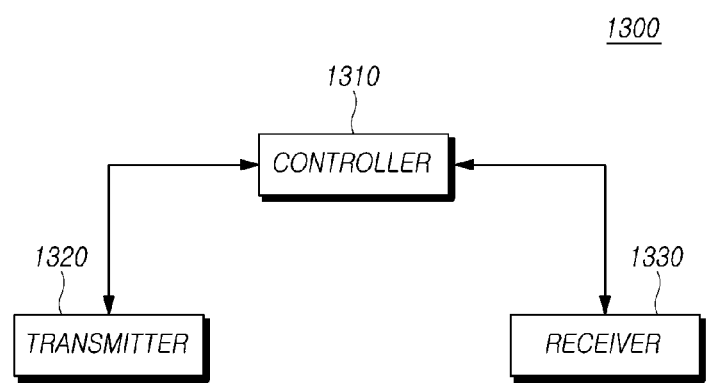
FIG. 13 is a diagram illustrating a base station, according to embodiments of the present disclosure.

FIG. 13 is a diagram illustrating an eNB according to embodiments of the present disclosure.

Referring to FIG. 13, the eNB 1300 includes a controller 1310, a transmitter 1320, and a receiver 1330.

The controller 1310 may configure a resource element shift value K for mapping a frequency domain resource of a TRS transmitted to the UE.

In this case, for example, the resource element shift value K may be determined as one of 0, 1, 2, and 3, which is the remainder of 4 and is a frequency interval value of the preset TRS.

The transmitter 1320 and the receiver 1330 are used to transmit and receive signals, messages, and data necessary for carrying out the present disclosure as described above, to and from the UE.

Specifically, the transmitter 1320 may transmit the resource element shift value K to the UE, and transmit the TRS mapped to the frequency domain resource based on the resource element shift value K to the UE.

The resource element shift value K may be transmitted to the UE by higher layer signaling (e.g., RRC signaling).

For example, a higher layer signaling message for transmitting the resource element shift value K to the UE may be formed of a 4-bit bitmap (the total number of bits of the bitmap may be changed according to the frequency interval value of the TRS). That is, the resource element shift value K indicated by the corresponding higher layer signaling message may be determined depending on whether a value of a bit of bits constituting the bitmap is set to 1.

For example, the TRS may be mapped at four subcarrier intervals to the frequency domain. That is, the TRS may be mapped to a resource indicated by one of the subcarrier indexes K, K+4, and K+8 on the frequency domain.

At this time, the TRS may be received from the eNB through resources in a CSI-RS resource set. That is, instead of allocating a separate resource for the TRS, the eNB may use a part of the resources in the CSI-RS resource set that can be used for the CSI-RS transmission as the TRS. The eNB may transmit information on whether the part of resources in the CSI-RS resource set is used as a TRS to the UE by higher layer signaling (e.g., RRC signaling).

Figure 14:
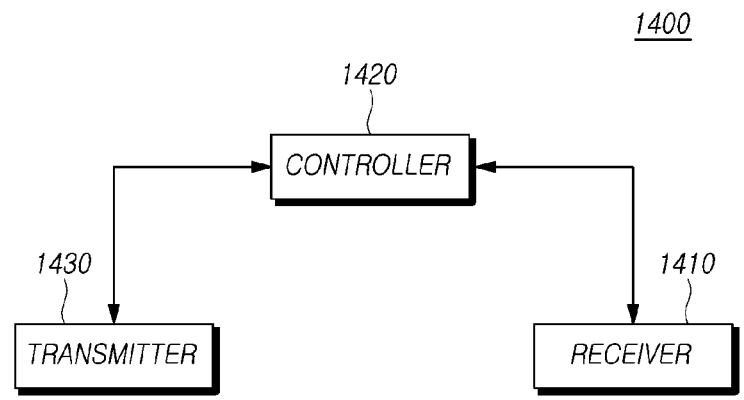
FIG. 14 is a diagram illustrating a user equipment, according to embodiments of the present disclosure.

FIG. 14 is a diagram illustrating a UE, according to embodiments of the present disclosure.

Referring to FIG. 14, the UE 1400 includes a receiver 1410, a controller 1420, and a transmitter 1430.

Receiver 1410 may receive a resource element shift value K for mapping the frequency domain resource of the TRS from resources on a frequency domain and receive the TRS mapped to the frequency domain resource based on the resource element shift value K from the eNB.

In this case, for example, the resource element shift value K may be determined as one of 0, 1, 2, and 3, which is the remainder of 4 and is a frequency interval value of the preset TRS.

The resource element shift value K may be received from the eNB by higher layer signaling (e.g., RRC signaling).

For example, a higher layer signaling message for receiving the resource element shift value K from the eNB may be constituted by a 4-bit bitmap (the total number of bits of the bitmap may be changed according to the frequency interval value of the TRS). That is, the resource element shift value K indicated by the corresponding higher layer signaling message may be determined depending on whether a value of a bit of bits constituting the bitmap is set to 1.

For example, the TRS can be mapped at four subcarrier intervals to the frequency domain. That is, the TRS may be mapped to a resource indicated by one of the subcarrier indexes K, K+4, and K+8 on the frequency domain.

At this time, the TRS can be received from the eNB through resources in a CSI-RS resource set. That is, instead of allocating a separate resource for the TRS, the eNB may use a part of the resources in the CSI-RS resource set that can be used for the CSI-RS transmission as the TRS. The eNB may transmit information on whether the part of resources in the CSI-RS resource set is used as a TRS to the UE by higher layer signaling (e.g., RRC signaling).

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of transmitting a tracking reference signal (TRS) by a base station to a user equipment, the method comprising:
    transmitting, by the base station, a radio resource control (RRC) signal including information on a resource element shift value K for mapping the TRS to a frequency domain resource, where K is an integer number equal to or greater than 0; and
    transmitting, by the base station, the TRS mapped to the frequency domain resource to the user equipment,
    wherein the resource element shift value K is represented as a bitmap consisting of 4 bits, each of the 4 bits consisting of exactly one bit,
    wherein the TRS mapped to the frequency domain resource is mapped at intervals of four subcarriers in a frequency domain,
    wherein only a single bit of the 4 bits is set to 1 in the bitmap consisting of 4 bits for the resource element shift value K,
    wherein the resource element shift value K included in the transmitted RRC signal indicates a specific value of resource element (RE) shift, the specific value of RE shift being one of 0, 1, 2, and 3, and
    wherein
        there is no RE shifting, if the single bit set to 1 is a first bit in the bitmap consisting of 4 bits,
        there is an RE shift of exactly one subcarrier, if the single bit set to 1 is a second bit in the bitmap consisting of 4 bits,
        there is an RE shift of exactly two subcarriers, if the single bit set to 1 is a third bit in the bitmap consisting of 4 bits, and
        there is an RE shift of exactly three subcarriers, if the single bit set to 1 is a fourth bit in the bitmap consisting of 4 bits.

2. The method of claim 1, wherein the TRS is mapped to a resource indicated by one of the subcarrier indexes K, K+4, and K+8 on a frequency domain.

3. The method of claim 1,
    wherein the TRS is transmitted in resources for a channel state information—reference signal (CSI-RS) resource set, and
    wherein the transmitting the RRC signal includes transmitting information on whether a part of the resources in the CSI-RS resource set is used as the TRS so that the base station uses the part of the resources in the CSI-RS resource set for the CSI-RS transmission instead of allocating a separate resource for the TRS.

4. The method of claim 1, further comprising:
    dynamically controlling the RE shift, if the specific value of the RE shift is changed to a new Sf value within a TRS transmission period,
    wherein the new Sf value is a frequency domain offset value set by the base station as a UE-specific value.

5. The method of claim 4, further comprising:
    transmitting the UE-specific value by separate signaling,
    wherein the base station sets the frequency domain offset value to be used for directly mapping the TRS according to each of a plurality of UEs.

6. The method of claim 1, further comprising:
    dynamically controlling the RE shift, if the specific value of the RE shift is changed to a new Sf value within a TRS transmission period,
    wherein the new Sf value is a frequency domain offset value set by the base station as a cell-specific value, the base station setting a same frequency domain offset value to all terminals located in the cell.

7. A method of receiving a tracking reference signal (TRS) by a user equipment from a base station, the method comprising:
    receiving, from the base station, a radio resource control (RRC) signal including information on a resource element shift value K for mapping the TRS to a frequency domain resource, where K is an integer number equal to or greater than 0; and
    receiving, from the base station, the TRS mapped to the frequency domain resource based on the information on the resource element shift value K,
    wherein the resource element shift value K is represented as a bitmap consisting of 4 bits, each of the 4 bits consisting of exactly one bit,
    wherein the TRS mapped to the frequency domain resource is mapped at intervals of four subcarriers in a frequency domain,
    wherein only a single bit of the 4 bits is set to 1 in the bitmap consisting of 4 bits for the resource element shift value K,
    wherein the resource element shift value K included in the transmitted RRC signal indicates a specific value of resource element (RE) shift, the specific value of RE shift being one of 0, 1, 2, and 3, and wherein
there is no RE shifting, if the single bit set to 1 is a first bit in the bitmap consisting of 4 bits,
there is an RE shift of exactly one subcarrier, if the single bit set to 1 is a second bit in the bitmap consisting of 4 bits,
there is an RE shift of exactly two subcarriers, if the single bit set to 1 is a third bit in the bitmap consisting of 4 bits, and
there is an RE shift of exactly three subcarriers, if the single bit set to 1 is a fourth bit in the bitmap consisting of 4 bits.

8. The method of claim 7, wherein the TRS is mapped to a resource indicated by one of the subcarrier indexes K, K+4, and K+8 on a frequency domain.

9. The method of claim 7,
wherein the TRS is received in resources for a channel state information—reference signal (CSI-RS) resource set, and
wherein the receiving the RRC signal includes receiving information on whether a part of the resources for the CSI-RS resource set is used as the TRS so that the base station uses the part of the resources in the CSI-RS resource set for the CSI-RS transmission instead of allocating a separate resource for the TRS.

10. A user equipment (UE) for receiving a tracking reference signal (TRS), the UE comprising:
a transceiver; and
a controller configured to control the transceiver to receive, from a base station, a radio resource control (RRC) signal including information on a resource element shift value K for mapping the TRS to a frequency domain resource, where K is an integer number equal to or greater than 0,
wherein the controller further controls the transceiver to receive, from the base station, the TRS mapped to the frequency domain resource based on the information on the resource element shift value K,
wherein the resource element shift value K is represented as a bitmap consisting of 4 bits, each of the 4 bits consisting of exactly one bit,
wherein the TRS mapped to the frequency domain resource is mapped at intervals of four subcarriers in a frequency domain,
wherein only a single bit of the 4 bits is set to 1 in the bitmap consisting of 4 bits for the resource element shift value K,
wherein the resource element shift value K included in the transmitted RRC signal indicates a specific value of resource element (RE) shift, the specific value of RE shift being one of 0, 1, 2, and 3, and
wherein
there is no RE shifting, if the single bit set to 1 is a first bit in the bitmap consisting of 4 bits,
there is an RE shift of exactly one subcarrier, if the single bit set to 1 is a second bit in the bitmap consisting of 4 bits,
there is an RE shift of exactly two subcarriers, if the single bit set to 1 is a third bit in the bitmap consisting of 4 bits, and
there is an RE shift of exactly three subcarriers, if the single bit set to 1 is a fourth bit in the bitmap consisting of 4 bits.

11. The UE of claim 10, wherein the TRS is mapped to a resource indicated by one of the subcarrier indexes K, K+4, and K+8 on a frequency domain.

12. The UE of claim 10,
wherein the TRS is received in resources for a channel state information—reference signal (CSI-RS) resource set, and
wherein the receiving the RRC signal includes receiving information on whether a part of the resources for the CSI-RS resource set is used as the TRS so that the base station uses the part of the resources in the CSI-RS resource set for the CSI-RS transmission instead of allocating a separate resource for the TRS.

* * * * *